(12) United States Patent
Xu et al.

(10) Patent No.: US 10,614,642 B2
(45) Date of Patent: Apr. 7, 2020

(54) METHOD AND DEVICE FOR UNLOCKING AIR CONDITIONING UNIT AND SERVER

(71) Applicants: GD MIDEA HEATING & VENTILATING EQUIPMENT CO., LTD., Foshan (CN); MIDEA GROUP CO., LTD., Foshan (CN)

(72) Inventors: Yongfeng Xu, Foshan (CN); Hongwei Li, Foshan (CN); Boqi Liang, Foshan (CN); Qihui Bu, Foshan (CN); Shilong Dong, Foshan (CN); Xiaohong Wu, Foshan (CN)

(*) Notice: Subject to any disclaimer, the term of this patent is extended or adjusted under 35 U.S.C. 154(b) by 0 days.

(21) Appl. No.: 15/555,082

(22) PCT Filed: Jul. 14, 2017

(86) PCT No.: PCT/CN2017/093041
§ 371 (c)(1),
(2) Date: Sep. 1, 2017

(87) PCT Pub. No.: WO2018/072492
PCT Pub. Date: Apr. 26, 2018

(65) Prior Publication Data
US 2019/0236871 A1    Aug. 1, 2019

(30) Foreign Application Priority Data
Oct. 20, 2016    (CN) .......................... 2016 1 0916843

(51) Int. Cl.
*G07C 9/00* (2020.01)
*F24F 11/30* (2018.01)
(Continued)

(52) U.S. Cl.
CPC .......... *G07C 9/00309* (2013.01); *F24F 11/30* (2018.01); *F24F 11/58* (2018.01);
(Continued)

(58) Field of Classification Search
CPC ................................................. G07C 9/00309
See application file for complete search history.

(56) References Cited

U.S. PATENT DOCUMENTS

| 2005/0204758 A1* | 9/2005 | Kwon ................. H04L 12/2818 62/175 |
| 2013/0221094 A1* | 8/2013 | Smith ................ G07C 9/00309 235/382 |

(Continued)

FOREIGN PATENT DOCUMENTS

| CN | 1523923 A | 8/2004 |
| CN | 103971435 A | 8/2014 |

(Continued)

OTHER PUBLICATIONS

CN First Office Action dated Nov. 2, 2018 in the corresponding CN application(application No. 201610916843.5).
(Continued)

*Primary Examiner* — Vernal U Brown
(74) *Attorney, Agent, or Firm* — Kilpatrick Townsend & Stockton, LLP

(57) ABSTRACT

The present disclosure provides a method for unlocking an air conditioning unit, including: when a server receives first identity information and unit information from a mobile terminal, performing a verification of the first identity information based on the unit information; and sending an unlocking instruction to the air conditioning unit corresponding to the unit information when the first identity information is verified, such that the air conditioning unit performs an unlocking operation based on the unlocking instruction. The present disclosure also provides a device for unlocking an air conditioning unit and a server. The present disclosure realizes unlocking the air conditioning unit when the first identity information is verified, thus ensuring that the current operator (user) is an authorized operator, and thus further avoiding problems that the air conditioning unit still have malfunctions and that irreversible damages are caused to the air conditioning unit.

4 Claims, 3 Drawing Sheets

(51) Int. Cl.
  *F24F 11/65* (2018.01)
  *F24F 11/64* (2018.01)
  *F24F 11/58* (2018.01)
  *F24F 11/62* (2018.01)
  *H04L 29/08* (2006.01)
  *F24F 11/63* (2018.01)

(52) U.S. Cl.
  CPC .............. *F24F 11/62* (2018.01); *F24F 11/64* (2018.01); *F24F 11/65* (2018.01); *G07C 9/00563* (2013.01); *H04L 67/125* (2013.01); *F24F 11/63* (2018.01)

(56) References Cited

U.S. PATENT DOCUMENTS

2014/0096210 A1* 4/2014 Dabbiere ............ H04L 63/0861 726/5
2016/0363335 A1* 12/2016 Xiong ..................... F24F 11/30

FOREIGN PATENT DOCUMENTS

| | | | |
|---|---|---|---|
| CN | 104349452 A | * | 2/2015 |
| CN | 104949280 A | | 9/2015 |
| CN | 105141795 A | | 12/2015 |
| CN | 105303387 A | * | 2/2016 |
| CN | 105303387 A | | 2/2016 |
| CN | 103971435 B | | 7/2016 |
| CN | 106534269 A | | 3/2017 |
| CN | 104349452 B | | 9/2018 |
| JP | 2016115162 A | | 6/2016 |
| KR | 100419957 B1 | | 2/2004 |
| KR | 20150022256 A | | 3/2015 |

OTHER PUBLICATIONS

Korean Office Action dated Dec. 10, 2018 in the corresponding KR application (application No. 10-2017-7025183).
Australian First Office Action dated Sep. 21, 2018 in the corresponding AU application (application No. 2017219158).
The Office Action dated Jun. 20, 2019 in the corresponding KR application No. 10-2017-7025183.

* cited by examiner

METHOD AND DEVICE FOR UNLOCKING AIR CONDITIONING UNIT AND SERVER

CROSS-REFERENCE TO RELATED APPLICATION

This application is a national phase entry under 35 USC § 371 of International Application PCT/CN2017/093041, filed Jul. 14, 2017, which claims priority to Chinese Application 201610916843.5, filed Oct. 20, 2016, the entire contents of which are incorporated herein by reference.

FIELD

The present disclosure relates to an air conditioning technology field, and more particularly to a method and a device for unlocking an air conditioning unit and a server.

BACKGROUND

In the related art, after installation of an air conditioning unit is completed, the air conditioning unit should be debugged, so as to determine that the currently installed air conditioning unit can work normally. With continuous development of air-conditioning industry, air conditioning systems, especially refrigeration systems and control systems of multi-connected air-conditioning systems, large-scale centrifugal units, modular units and other air-conditioning systems become more complex. Requirement for the technical personnel debugging and maintaining air conditioning units is very high. Generally, only the technical personnel who have been professionally trained and have been authorized can carry out the appropriate operation.

However, for most air conditioning units, when they are debugged after they have been unlocked, it is difficult to ensure whether a currently operator is an authorized operator. When the operator is a non-authorized operator without assurance of maintenance quality, because the operator is in absence of professional training, the air conditioning units may still have malfunctions or even may have irreversible damage due to wrong debugging or maintaining methods and incorrect reason analysis.

SUMMARY

Embodiments of the present disclosure provide a method and a device for unlocking an air conditioning unit and a server, which aim to solve technical problems that the air conditioning units may still have malfunctions, and even that irreversible damages are caused to the air conditioning unit in maintenance caused by a non-authorized operator who does not have assurance of maintenance quality.

To achieve the above objectives, the present disclosure provides a method for unlocking an air conditioning unit. The method for unlocking an air conditioning unit includes:

when a server receives first identity information and unit information from a mobile terminal, performing a verification of the first identity information based on the unit information, in which, when the mobile terminal receives the unit information of an air conditioning unit, the mobile terminal displays a corresponding input interface of identity information based on the unit information, such that a user inputs the first identity information in the input interface, and when the mobile terminal receives the first identity information, the mobile terminal sends the first identity information and the unit information to the server;

sending an unlocking instruction to the air conditioning unit corresponding to the unit information when the first identity information is verified, such that the air conditioning unit performs an unlocking operation according to the unlocking instruction.

In an embodiment, after performing a verification of the first identity information based on the unit information, the method for unlocking an air conditioning unit further includes:

controlling an authentication counter to perform counting operation when the verification of the first identity information fails;

when a count value of the authentication counter is less than or equal to a preset value, sending an identity information obtaining request to the mobile terminal, such that the mobile terminal returns second identity information based on the identity information obtaining request.

In an embodiment, after controlling an authentication counter to perform counting operation, the method for unlocking an air conditioning unit further includes:

when the count value of the authentication counter is larger than the preset value, sending an image capturing instruction to the mobile terminal, so as to control the mobile terminal to capture image information of an operator of the mobile terminal based on the image capturing instruction and to return captured image information;

when the image information is received from the mobile terminal, storing the unit information and the image information correspondingly, and resetting the authentication counter.

In an embodiment, performing a verification of the first identity information based on the unit information includes:

obtaining preset identity information corresponding to the unit information from a preset database;

determining whether the first identity information exists in the preset identity information, in which, when it is determined that the first identity information exists in the preset identity information, the first identity information is verified.

In addition, the present disclosure further provides a device for unlocking an air conditioning unit. The device for unlocking an air conditioning unit includes:

a verifying module, configured to perform a verification of first identity information based on unit information when the first identity information and the unit information are received from a mobile terminal, in which, when the mobile terminal receives the unit information of an air conditioning unit, the mobile terminal displays a corresponding input interface of identity information based on the unit information, such that a user inputs the first identity information in the input interface, and when the mobile terminal receives the first identity information, the mobile terminal sends the first identity information and the unit information to a server;

a first sending module, configured to send an unlocking instruction to the air conditioning unit corresponding to the unit information when the first identity information is verified, such that the air conditioning unit performs an unlocking operation according to the unlocking instruction.

In an embodiment, the device for unlocking an air conditioning unit further includes:

a control module, configured to control an authentication counter to perform counting operation when the verification of the first identity information fails;

a second sending module, configured to send an identity information obtaining request to the mobile terminal, such that the mobile terminal returns second identity information based on the identity information obtaining request.

In an embodiment, the device for unlocking an air conditioning unit further includes:

a third sending module, configured to send an image capturing instruction to the mobile terminal when a count value of the authentication counter is larger than a preset value, so as to control the mobile terminal to capture image information of an operator of the mobile terminal based on the image capturing instruction and to return captured image information;

a storing module, configured to store the unit information and the image information correspondingly when the image information is received from the mobile terminal, and to reset the authentication counter.

In an embodiment, the verifying module includes:

an obtaining unit, configured to obtain preset identity information corresponding to the unit information from a preset database;

a determining unit, configured to determine whether the first identity information exists in the preset identity information, in which, when it is determined that the first identity information exists in the preset identity information, the first identity information is verified.

In addition, the present disclosure further provides a server. The server includes the device for unlocking an air conditioning unit according to any one of the above embodiments.

In embodiments of the present disclosure, when the server receives the first identity information and the unit information from the mobile terminal, verification of the first identity information is performed based on the unit information, and then, the server sends an unlocking instruction to the air conditioning unit corresponding to the unit information when the first identity information is verified, which realizes that the air conditioning unit is unlocked when the first identity information is verified, such that it is ensured that current operator (the user) is an authorized operator, thus avoiding problems that the air conditioning unit still have malfunctions and that irreversible damages are caused to the air conditioning unit in maintenance due to being lack of professional training of the operator, wrong debugging or maintenance methods, inaccurate reason analysis, and the like, and ensuring quality of the air conditioning unit.

Realization of objectives, functional characteristics and advantages of the present disclosure will be described with reference to the drawings in cooperation with embodiments.

DETAILED DESCRIPTION

It should be understood that, the embodiments described herein are used to explain the present disclosure, and shall not be construed to limit the present disclosure.

In embodiments of the present disclosure, an air conditioning unit is provided with a communication module. The communication module is configured to realize data interaction between the air conditioning unit and a server, and data interaction between the air conditioning unit and a mobile terminal. That is to say, the air conditioning unit sends operation data of the air conditioning unit to the server via the communication module. The communication module may be a network module directly connected to Ethernet line, a WiFi module, or a cellular data communication module having a function of 2G/3G/4G/5G It is easy to understand that, the communication module can perform data interaction with other modules of the air conditioning unit via communication modes such as Universal Asynchronous Receiver/Transmitter (UART for short), Rs485, CAN bus, and the like.

Based on above air conditioning unit, a method and a device for unlocking an air conditioning unit according to embodiments of the present disclosure are provided.

Figure 1:
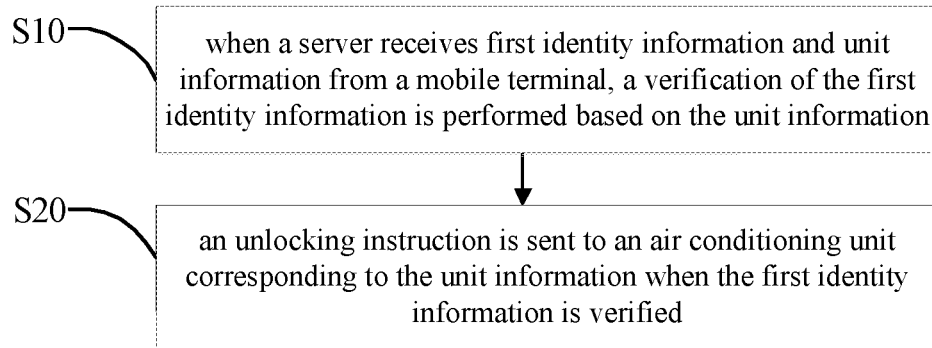
FIG. 1 is a flow chart of a method for unlocking an air conditioning unit according a first embodiment of the present disclosure.

The present disclosure provides a method for unlocking an air conditioning unit. FIG. 1 is a flow chart of a method for unlocking an air conditioning unit according a first embodiment of the present disclosure.

In an embodiment, the method for unlocking an air conditioning unit includes followings.

In step S10, when a server receives first identity information and unit information from a mobile terminal, verification of the first identity information is performed based on the unit information. When the mobile terminal receives the unit information of an air conditioning unit, the mobile terminal displays a corresponding input interface of identity information based on the unit information, such that a user inputs the first identity information in the input interface. When the mobile terminal receives the first identity information, the mobile terminal sends the first identity information and the unit information to the server.

In an embodiment, the mobile terminal includes a smart terminal such as a mobile phone, an IPAD, and the like. The mobile terminal has an application (APP for short) corresponding to the method for unlocking an air conditioning unit according to embodiments of the present disclosure installed. After the APP is started, an operator can trigger a debug request for the air conditioning unit in a display interface of the APP. When the mobile terminal receives the debug request, the mobile terminal displays an input interface of unit information, such that the user input unit information of an air conditioning unit to be debugged, i.e., the operator can input the unit information of the air conditioning unit to be debugged according to promoting information from the input interface of unit information. When the mobile terminal receives the unit information, the mobile terminal displays a corresponding input interface of identity information according to the unit information, such that the user inputs the first identity information in the input interface of identity information, i.e., the operator can input corresponding first identity information (i.e. the first identity information of the operator) according to promoting information from the input interface of identity information. When the mobile terminal receives the first identity information, the mobile terminal sends the first identity information and the unit information to the server.

When the server receives the first identity information and the unit information from the mobile terminal, the server performs verification of the first identity information based on the unit information. The server obtains preset identity information corresponding to the unit information from a preset database. And then, it is determined whether the first identity information exists in the preset identity information. When it is determined that the first identity information exists in the preset identity information, the first identity information is verified. When the first identity information does not exist in the preset identity information, verification of the first identity information fails.

In step 20, an unlocking instruction is sent to an air conditioning unit corresponding to the unit information when the first identity information is verified, such that the air conditioning unit performs an unlocking operation according to the unlocking instruction.

In an embodiment, when the first identity information is verified, the server sends the unlocking instruction to the air conditioning unit corresponding to the unit information, such that the air conditioning unit performs an unlocking operation based on the unlocking instruction. When the air conditioning unit is unlocked, a debug operation is performed, and debug data is sent to the server in a process of the debug operation, such that the server stores the debug data to facilitate subsequent processing.

With the method for unlocking an air conditioning unit according to embodiments of the present disclosure, when the server receives the first identity information and the unit information from the mobile terminal, verification of the first identity information is performed based on the unit information, and then, the server sends an unlocking instruction to the air conditioning unit corresponding to the unit information when the first identity information is verified, which realizes that the air conditioning unit is unlocked when the first identity information is verified, such that it is ensured that current operator (the user) is an authorized operator, thus avoiding problems that the air conditioning unit still have malfunctions and that irreversible damages are caused to the air conditioning unit in maintenance due to the operator lacking of professional training, wrong debugging or maintenance methods, inaccurate reason analysis, and the like, and ensuring quality of the air conditioning unit.

Figure 2:
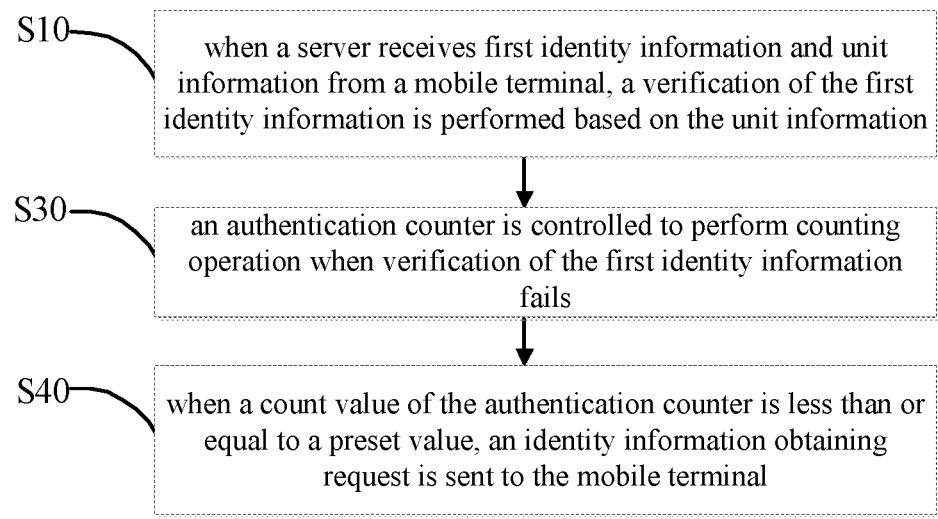
FIG. 2 is a flow chart of a method for unlocking an air conditioning unit according a second embodiment of the present disclosure.

A method for unlocking an air conditioning unit according to a second embodiment of the present disclosure is provided based on the first embodiment. As illustrated in FIG. 2, in this embodiment, after step S10, the method for unlocking an air conditioning unit further includes followings.

In step S30, an authentication counter is controlled to perform counting operation when verification of the first identity information fails.

In an embodiment, when the first identity information does not exist in the preset identity information, the verification of the first identity information fails. When the verification of the first identity information fails, the server controls the authentication counter to perform the counting operation, so as to record the number of times that the verification of the current first identity information fails.

In step 40, when a count value of the authentication counter is less than or equal to a preset value, an identity information obtaining request is sent to the mobile terminal, such that the mobile terminal returns second identity information based on the identity information obtaining request.

The preset value can be reasonably set according to demands. For example, when the authentication counter begins to count from 0, the preset value may be 3.

In an embodiment, when the count value of the authentication counter is less than or equal to the preset value, the server sends the identity information obtaining request to the mobile terminal, such that the mobile terminal returns second identity information based on the identity information obtaining request. In detail, the mobile terminal displays an input interface of second identity information based on the identity information obtaining request, such that the user inputs the second identity information, and the mobile terminal returns the second identity information input by the user to the server.

When the server receives the second identity information, the server performs a verification of the second identity information, and sends the unlocking instruction to the air conditioning unit corresponding to the unit information when the second identity information is verified, such that the air conditioning unit performs an unlocking operation according to the unlocking instruction. The authentication counter is controlled to perform counting operation when verification of the second identity information fails.

With the method for unlocking an air conditioning unit according to embodiments of the present disclosure, by controlling the authentication counter to perform the counting operation when the verification of the first identity information fails, and by sending the identity information obtaining request to the mobile terminal when the count value of the authentication counter is less than or equal to the preset value, so as to control the mobile terminal to return second identity information according to the identity information obtaining request, it realizes that the identity information obtaining request is sent to obtain the second identity information when the verification of the first identity information fails and the count value of the authentication counter is less than or equal to the preset value, thus avoiding that the air conditioning unit cannot be unlocked when the first identity information input by the operator is wrong.

Figure 3:
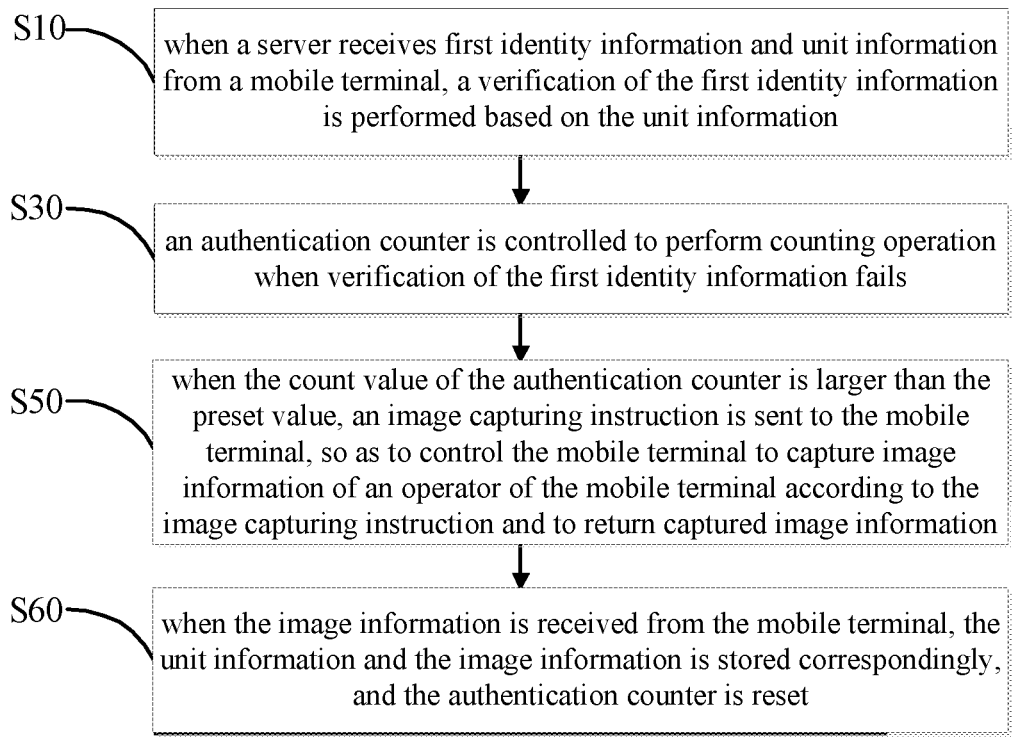
FIG. 3 is a flow chart of a method for unlocking an air conditioning unit according a third embodiment of the present disclosure.

A method for unlocking an air conditioning unit according to a third embodiment of the present disclosure is provided based on the second embodiment. As illustrated in FIG. 3, in this embodiment, after step S30, the method for unlocking an air conditioning unit further includes followings.

In step 50, when the count value of the authentication counter is larger than the preset value, an image capturing instruction is sent to the mobile terminal, so as to control the mobile terminal to capture image information of an operator of the mobile terminal based on the image capturing instruction and to return captured image information.

In an embodiment, when the count value is larger than the preset value, verification of the identity information input by the operator still fails after verification of the identity information has been performed multiple times. At this time, the operator may be a non-authorized operator. Therefore, the server sends the image capturing instruction to the mobile terminal, so as to control the mobile terminal to capture image information of the operator of the mobile terminal according to the image capturing instruction and to return the captured image information.

In step 60, when the image information is received from the mobile terminal, the unit information and the image information is stored correspondingly, and the authentication counter is reset.

In an embodiment, when receiving the image information from the mobile terminal, the server stores the unit information and the image information correspondingly, and the server resets the authentication counter, such that processes such as pursuing responsibility and the like may be performed according to the unit information and the image information.

With the method for unlocking an air conditioning unit according to embodiments of the present disclosure, by sending the image capturing instruction to the mobile terminal when the count value of the authentication counter is larger than the preset value, so as to control the mobile terminal to capture the image information of the operator of the mobile terminal according to the image capturing instruction and to return the captured image information, and by storing the unit information and the image information correspondingly and resetting the authentication counter when the image information is received from the mobile terminal, it realizes that the image information of the operator of the mobile terminal is stored when the count value is larger than the preset value, and thus it is easy to perform processes such as pursuing responsibility and the like according to the unit information and the image information.

Figure 4:
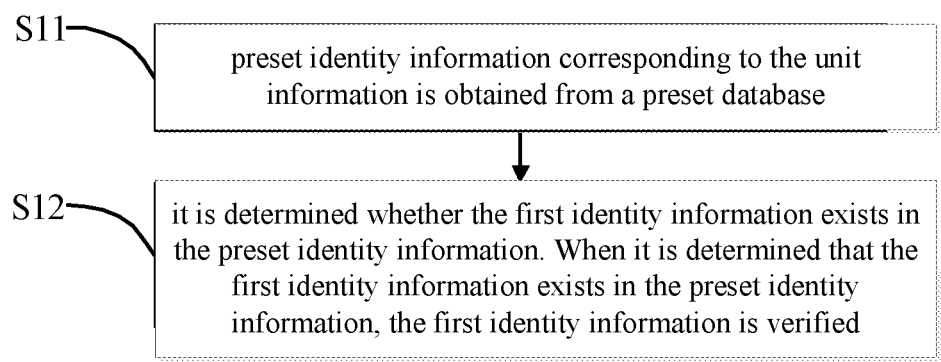
FIG. 4 is a flow chart of verifying the first identity information in the method for unlocking an air conditioning unit according a fourth embodiment of the present disclosure.

A method for unlocking an air conditioning unit according to a fourth embodiment of the present disclosure is provided based on the first embodiment. As illustrated in FIG. 4, in this embodiment, step S10 includes followings.

In step S11, preset identity information corresponding to the unit information is obtained from a preset database.

The preset identity information is information of an authorized operator of the air conditioning unit corresponding to the unit information. The preset identity information and the unit information are correspondingly stored in the preset database.

In step S12, it is determined whether the first identity information exists in the preset identity information. When it is determined that the first identity information exists in the preset identity information, the first identity information is verified.

With the method for unlocking an air conditioning unit according to embodiments of the present disclosure, by obtaining the preset identity information corresponding to the unit information from the preset database, determining whether the first identity information exists in the preset identity information, and determining that the first identity information is verified when it is determined that the first identity information exists in the preset identity information, accurate verification of the first identity information is realized, thus ensuring accuracy of unlocking the air conditioning unit.

Figure 5:
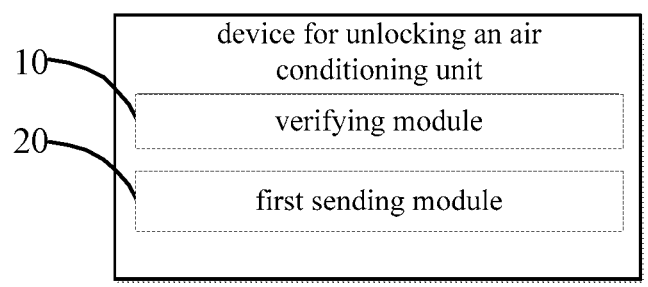
FIG. 5 is a block diagram of a device for unlocking an air conditioning unit according a first embodiment of the present disclosure.

The present disclosure further provides a device for unlocking an air conditioning unit. As illustrated in FIG. 5, FIG. 5 is a block diagram of a device for unlocking an air conditioning unit according a first embodiment of the present disclosure.

In an embodiment, the device for unlocking an air conditioning unit includes a verifying module 10 and a first sending module 20.

The verifying module 10 is configured to perform a verification of first identity information based on unit information when the first identity information and the unit information are received from a mobile terminal. When the mobile terminal receives the unit information of an air conditioning unit, the mobile terminal displays a corresponding input interface of identity information according to the unit information, such that a user inputs the first identity information in the input interface. When the mobile terminal receives the first identity information, the mobile terminal sends the first identity information and the unit information to a server.

In an embodiment, the mobile terminal includes a smart terminal such as a mobile phone, an IPAD, and the like. The mobile terminal has an application (APP for short) corresponding to the method for unlocking an air conditioning unit according to embodiments of the present disclosure installed. After the APP is started, an operator can trigger a debug request for the air conditioning unit in a display interface of the APP. When the mobile terminal receives the debug request, the mobile terminal displays an input interface of unit information, such that the user input unit information of an air conditioning unit to be debugged, i.e., the operator can input the unit information of the air conditioning unit to be debugged according to promoting information from the input interface of unit information. When the mobile terminal receives the unit information, the mobile terminal displays a corresponding input interface of identity information according to the unit information, such that the user inputs the first identity information in the input interface of identity information, i.e., the operator can input corresponding first identity information (i.e. the first identity information of the operator) according to promoting information from the input interface of identity information. When the mobile terminal receives the first identity information, the mobile terminal sends the first identity information and the unit information to the server.

When receiving the first identity information and the unit information from the mobile terminal, the verifying module 10 performs verification of the first identity information based on the unit information. The server obtains preset identity information corresponding to the unit information from a preset database. And then, it is determined whether the first identity information exists in the preset identity information. When it is determined that the first identity information exists in the preset identity information, the first identity information is verified. When the first identity information does not exist in the preset identity information, verification of the first identity information fails.

The first sending module 20 is configured to send an unlocking instruction to an air conditioning unit corresponding to the unit information when the first identity information is verified, such that the air conditioning unit performs an unlocking operation according to the unlocking instruction.

In an embodiment, when the first identity information is verified, the server sends the unlocking instruction to the air conditioning unit corresponding to the unit information, such that the air conditioning unit performs an unlocking operation based on the unlocking instruction. When the air conditioning unit is unlocked, a debug operation is performed, and debug data is sent to the server in a process of the debug operation, such that the server stores the debug data to facilitate subsequent processing.

With the device for unlocking an air conditioning unit according to embodiments of the present disclosure, when the server receives the first identity information and the unit information from the mobile terminal, the verifying module 10 performs verification of the first identity information based on the unit information, and then, the first sending module 20 sends an unlocking instruction to the air conditioning unit corresponding to the unit information when the first identity information is verified, realizing that the air conditioning unit is unlocked when the first identity information is verified, such that it is ensured that current operator (the user) is an authorized operator, thus avoiding problems that the air conditioning unit still have malfunctions and that irreversible damages are caused to the air conditioning unit in maintenance due to the operator lacking of professional training, wrong debugging or maintenance methods, inaccurate reason analysis, and the like, and ensuring quality of the air conditioning unit.

Figure 6:
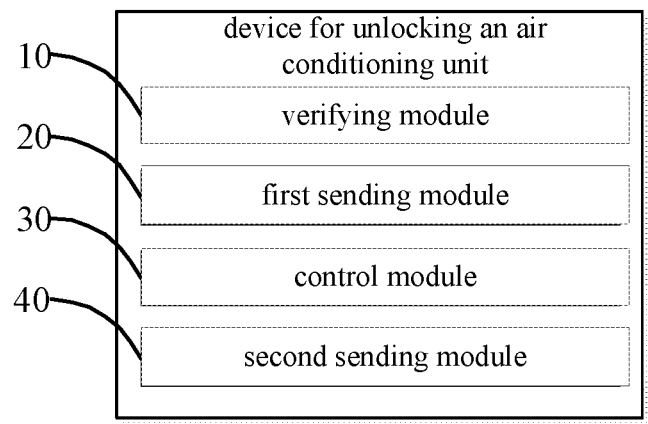
FIG. 6 is a block diagram of a device for unlocking an air conditioning unit according a second embodiment of the present disclosure.

A device for unlocking an air conditioning unit according to a second embodiment of the present disclosure is provided based on the first embodiment. As illustrated in FIG. 6, in this embodiment, the device for unlocking an air conditioning unit further includes a control module 30 and a second sending module 40.

The control module 30 is configured to control an authentication counter to perform counting operation when verification of the first identity information fails.

In an embodiment, when the first identity information does not exist in the preset identity information, the verification of the first identity information fails. When the verification of the first identity information fails, the control module 30 controls the authentication counter to perform the counting operation, so as to record the number of times that the verification of the current first identity information fails.

The second sending module 40 is configured to send an identity information obtaining request to the mobile terminal, such that the mobile terminal returns second identity information according to the identity information obtaining request.

The preset value can be reasonably set according to demands. For example, when the authentication counter begins to count from 0, the preset value may be 3.

In an embodiment, when the count value of the authentication counter is less than or equal to the preset value, the server sends the identity information obtaining request to the mobile terminal, such that the mobile terminal returns second identity information according to the identity information obtaining request. In detail, the mobile terminal displays an input interface of second identity information based on the identity information obtaining request, such that the user inputs the second identity information, and the mobile terminal returns the second identity information input by the user to the server.

When receiving the second identity information, the server performs verification of the second identity information, and sends the unlocking instruction to the air conditioning unit corresponding to the unit information when the second identity information is verified, such that the air conditioning unit performs an unlocking operation according to the unlocking instruction. The authentication counter is controlled to perform counting operation when verification of the second identity information fails.

With the device for unlocking an air conditioning unit according to embodiments of the present disclosure, the control module 30 controls the authentication counter to perform the counting operation when the verification of the first identity information fails, and then the second sending module 40 sends the identity information obtaining request to the mobile terminal when the count value of the authentication counter is less than or equal to the preset value, such that the mobile terminal returns second identity information according to the identity information obtaining request, which realizes that the identity information obtaining request is sent to obtain the second identity information when the verification of the first identity information fails and the count value of the authentication counter is less than or equal to the preset value, thus avoiding that the air conditioning unit cannot be unlocked when the first identity information input by the operator is wrong.

Figure 7:
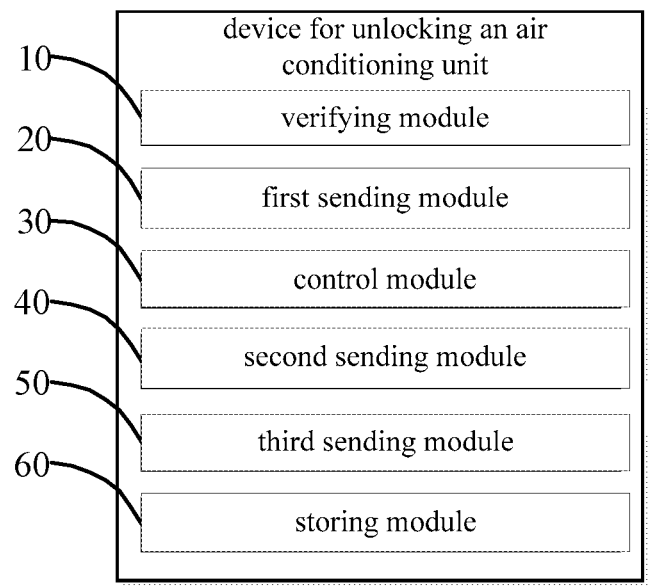
FIG. 7 is a block diagram of a device for unlocking an air conditioning unit according a third embodiment of the present disclosure.

A device for unlocking an air conditioning unit according to a third embodiment of the present disclosure is provided based on the second embodiment. As illustrated in FIG. 7, in this embodiment, the device for unlocking an air conditioning unit further includes a third sending module 50 and a storing module 60.

The third sending module 50 is configured to send an image capturing instruction to the mobile terminal when the count value of the authentication counter is larger than the preset value, so as to control the mobile terminal to capture image information of an operator of the mobile terminal according to the image capturing instruction and to return captured image information.

In an embodiment, when the count value is larger than the preset value, verification of the identity information input by the operator still fails after verification of the identity information has been performed multiple times. At this time, the operator may be a non-authorized operator. Therefore, the server sends the image capturing instruction to the mobile terminal, so as to control the mobile terminal to capture the image information of the operator of the mobile terminal according to the image capturing instruction and to return the captured image information.

The storing module 60 is configured to store the unit information and the image information correspondingly when the image information is received from the mobile terminal, and to reset the authentication counter.

In an embodiment, when receiving the image information from the mobile terminal, the server stores the unit information and the image information correspondingly, and the server resets the authentication counter, such that processes such as pursuing responsibility and the like may be performed according to the unit information and the image information.

With the device for unlocking an air conditioning unit according to embodiments of the present disclosure, the third sending module 50 sends the image capturing instruction to the mobile terminal when the count value of the authentication counter is larger than the preset value, so as to control the mobile terminal to capture the image information of the operator of the mobile terminal according to the image capturing instruction and to return the captured image information, and then the storing module 60 stores the unit information and the image information correspondingly and resets the authentication counter when the image information is received from the mobile terminal, which realizes that the image information of the operator of the mobile terminal is stored when the count value is larger than the preset value, and thus it is easy to perform processes such as pursuing responsibility and the like according to the unit information and the image information.

Figure 8:
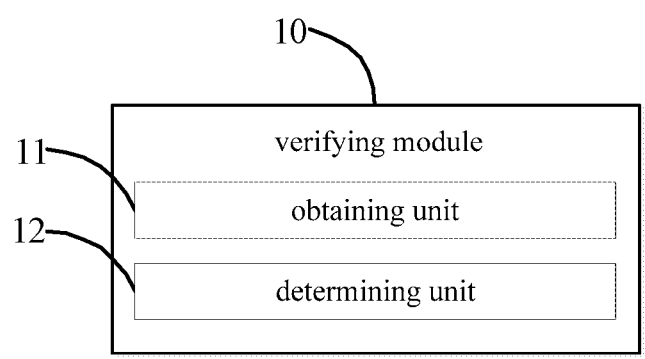
FIG. 8 is a block diagram of a verifying module in a device for unlocking an air conditioning unit according a first embodiment of the present disclosure.

A device for unlocking an air conditioning unit according to a fourth embodiment of the present disclosure is provided based on the first embodiment. As illustrated in FIG. 8, in this embodiment, the verifying module 10 includes an obtaining unit 11 and a determining unit 12.

The obtaining unit 11 is configured to obtain preset identity information corresponding to the unit information from a preset database.

The preset identity information is information of an authorized operator of the air conditioning unit corresponding to the unit information. The preset identity information and the unit information are correspondingly stored in the preset database.

The determining unit 12 is configured to determine whether the first identity information exists in the preset identity information. When it is determined that the first identity information exists in the preset identity information, the first identity information is verified.

With the device for unlocking an air conditioning unit according to embodiments of the present disclosure, by obtaining the preset identity information corresponding to the unit information from the preset database, determining whether the first identity information exists in the preset identity information, and determining that the first identity information is verified when it is determined that the first identity information exists in the preset identity information, accurate verification of the first identity information is realized, thus ensuring accuracy of unlocking the air conditioning unit.

The present disclosure further provides a server. The server includes the device for unlocking an air conditioning unit according to any one of above embodiments.

Above are preferable embodiments of the present disclosure, and are not intended to limit the scope of the present disclosure. Any transformations of equivalent constructions or equivalent processes using the specification and the accompanying drawings of the present disclosure, either directly or indirectly, in other related technical fields, is likewise included within the scope of the protection of the present disclosure.

What is claimed is:

1. A method for unlocking and debugging an air conditioning unit, comprising:
   receiving, by a mobile terminal, debugging request for debugging the air conditioning unit;
   displaying, by the mobile terminal, a first input interface for unit information of the air conditioning unit;
   inputting, by a user, the unit information in the first input interface;
   displaying, by the mobile terminal, a second input interface for identity information of user based on the unit information;
   inputting, by the user, the first identity information in the second input interface;
   sending, by the mobile terminal, the first identity information and the unit information to a server;
   performing, by the server, a verification of the first identity information based on the unit information;
   sending, by the server, an unlocking instruction to the air conditioning unit corresponding to the unit information when the first identity information is verified;
   performing, by the air conditioning unit, an unlocking operation based on the unlocking instruction;
   performing, by the user, a debug operation on the air conditioning unit sending, by the air conditioning unit, debug data to the server in the debug operation; and
   storing, by the server, the debug data.

2. The method according to claim 1, after performing a verification of the first identity information based on the unit information, further comprising:
   controlling an authentication counter to perform counting operation, when the verification of the first identity information fails;
   when a count value of the authentication counter is less than or equal to a preset value, sending an identity information obtaining request to the mobile terminal, such that the mobile terminal returns second identity information based on the identity information obtaining request.

3. The method according to claim 2, after controlling an authentication counter to perform counting operation, further comprising:
   when the count value of the authentication counter is larger than the preset value, sending an image capturing instruction to the mobile terminal, so as to control the mobile terminal to capture image information of an operator of the mobile terminal based on the image capturing instruction and to return captured image information;
   when the image information is received from the mobile terminal, storing the unit information and the image information correspondingly, and resetting the authentication counter.

4. The method according to claim 1, wherein performing a verification of the first identity information based on the unit information comprises:
   obtaining preset identity information corresponding to the unit information from a preset database;
   determining whether the first identity information exists in the preset identity information, wherein, when it is determined that the first identity information exists in the preset identity information, the first identity information is verified.

* * * * *